(12) United States Patent
Konda et al.

(10) Patent No.: US 10,791,118 B2
(45) Date of Patent: Sep. 29, 2020

(54) AUTHENTICATING NETWORK SERVICES PROVIDED BY A NETWORK

(71) Applicant: McAfee, LLC, Santa Clara, CA (US)

(72) Inventors: Tirumaleswar Reddy Konda, Bangalore (IN); Himanshu Srivastava, Karnataka (IN); Harsha Ramamurthy Joshi, Bangalore (IN); Srikanth Nalluri, Karnataka (IN); Dattatraya Kulkarni, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 253 days.

(21) Appl. No.: 15/940,573

(22) Filed: Mar. 29, 2018

(65) Prior Publication Data

US 2019/0306166 A1 Oct. 3, 2019

(51) Int. Cl.
| | |
|---|---|
| *H04L 29/06* | (2006.01) |
| *H04L 9/00* | (2006.01) |
| *H04L 9/32* | (2006.01) |
| *H04W 12/00* | (2009.01) |
| *H04W 12/06* | (2009.01) |
| *H04L 29/12* | (2006.01) |

(52) U.S. Cl.
CPC ......... *H04L 63/0876* (2013.01); *H04L 9/006* (2013.01); *H04L 9/3263* (2013.01); *H04L 63/0428* (2013.01); *H04L 63/0823* (2013.01); *H04W 12/00516* (2019.01); *H04W 12/0609* (2019.01); *H04L 61/1511* (2013.01); *H04L 61/2015* (2013.01); *H04L 63/20* (2013.01)

(58) Field of Classification Search
CPC . H04L 63/0876; H04L 63/0823; H04L 9/006; H04L 9/3263; H04W 12/0609; H04W 12/00516
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 2010/0070771 | A1 | 3/2010 | Chen et al. |
| 2013/0036307 | A1 | 2/2013 | Gagliano et al. |

(Continued)

FOREIGN PATENT DOCUMENTS

| | | |
|---|---|---|
| EP | 1545074 A1 | 6/2005 |
| WO | 2019190793 A1 | 10/2019 |

OTHER PUBLICATIONS

Intentional Search Report and Written Opinion in Intentional Patent Application No. PCT/US2019/022689 dated May 10, 2019, 10 pages.

*Primary Examiner* — Paul E Callahan
(74) *Attorney, Agent, or Firm* — Patent Capital Group

(57) ABSTRACT

Particular embodiments described herein provide for an electronic device that can be configured to establish a connection with a router, obtain identification for the router, communicate the identification of the router to a network element, receive a hash of at least a portion of a certificate for the router, and disconnect the connection and establish a new connection with the router, where the hash is used to authenticate network services received from the router during the new connection. In an example, the hash is part of a subject public key infrastructure (SPKI) pin set.

25 Claims, 11 Drawing Sheets

(56) References Cited

U.S. PATENT DOCUMENTS

2015/0372875 A1* 12/2015 Turon .................. H04L 63/166
                                                                370/254
2017/0034776 A1*  2/2017 Hou ..................... H04W 12/08
2018/0302787 A1* 10/2018 Boylan ................ H04W 12/04

* cited by examiner

AUTHENTICATING NETWORK SERVICES PROVIDED BY A NETWORK

TECHNICAL FIELD

This disclosure relates in general to the field of information security, and more particularly, to authenticating network services provided by a network.

BACKGROUND

The field of network security has become increasingly important today. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. In addition, a malicious operator that gains access to a system may be able to steal sensitive information or perform any number of other malicious actions. Hence, significant administrative challenges remain for protecting computers and computer networks from malicious and inadvertent exploitation by malicious software or malicious operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth examples of apparatuses, methods, and systems relating to a system for authenticating network services provided by a network in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
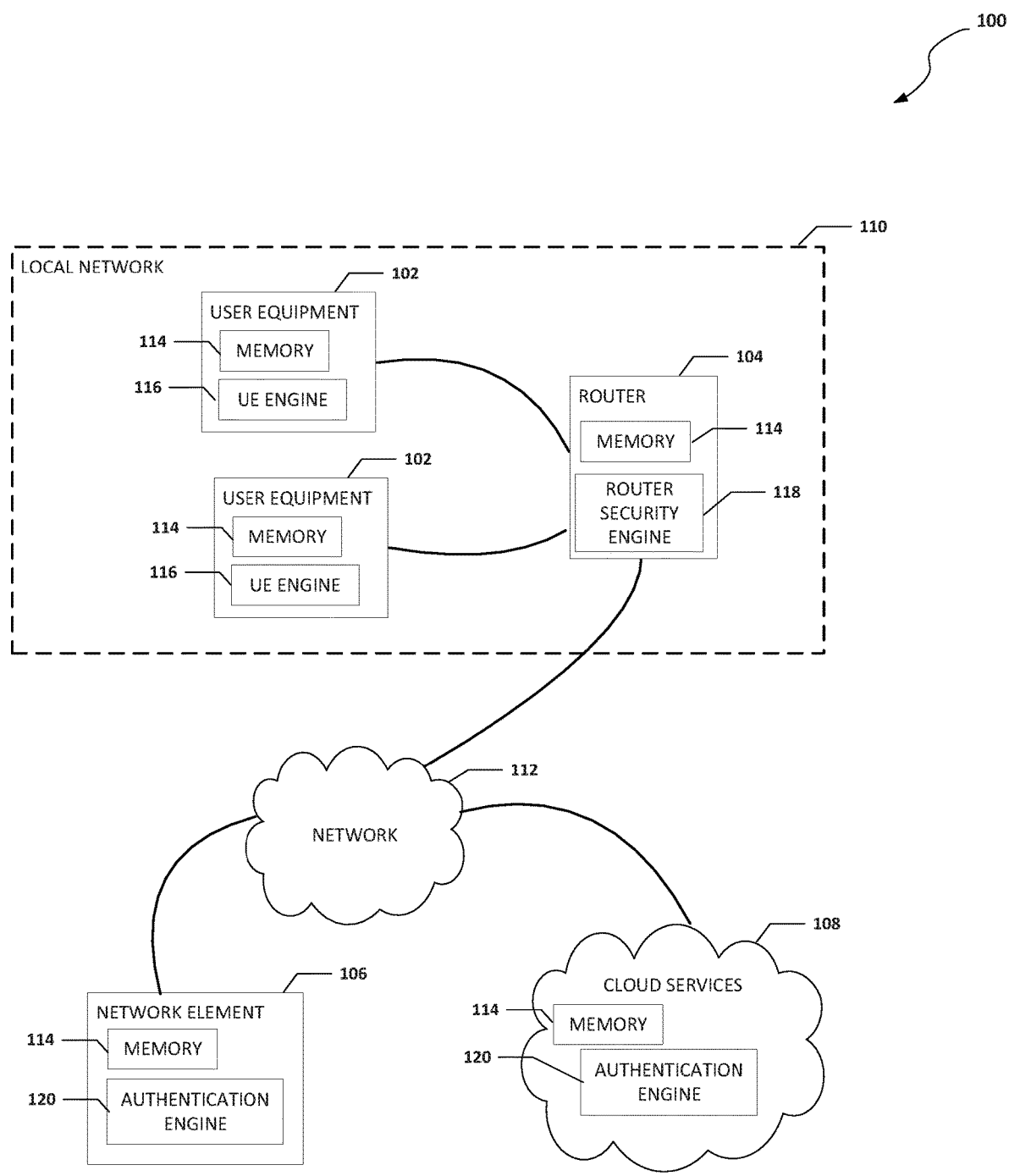
FIG. 1 is a simplified block diagram of a system for authenticating network services provided by a network in accordance with an embodiment of the present disclosure.

FIG. 1 is a simplified block diagram of a communication system 100 for authenticating network services provided by a network in accordance with an embodiment of the present disclosure. Communication system 100 can include one or more instances of user equipment 102, a router 104, a network element 106, and cloud services 108. User equipment 102 may be in communication with router 104 using local network 110 (e.g., a home network). Router 104 can be in communication with network element 106 and cloud services 108 using network 112.

Each of user equipment 102 can include memory 114 and a user equipment engine (UE engine) 116. Router 104 can include memory 114 and a router security engine 118. Network element 106 can include memory 114 and an authentication engine 120. Cloud services 108 can include memory 114 and authentication engine 120.

Elements of FIG. 1 may be coupled to one another through one or more interfaces employing any suitable connections (wired or wireless), which provide viable pathways for network (e.g., local network 110 and network 112) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In an example, communication system 100 can be configured to allow router 104 to become a trusted router and register with network element 106 or cloud services 108 as a trusted router. Router 104 can register with network element 106 or cloud services 108 and become a trusted router by using a certificate issued by the manufacturer, shared-credentials (e.g. license key) stored in memory 114, HTTP-based authentication, or some other means that can be used to allow router 104 to become a trusted router. Each user equipment 102 can connect with router 104, obtain information for router 104, and communicate with network element 106 or cloud services 108 to determine if router 104 is registered as a trusted router. If router 104 is determined to be a trusted router, then each user equipment 102 can connect to and trust router 104 and authenticate network services provided by router 104. Some of the examples described herein are described with reference towards domain name system (DNS) security and privacy but is equally applicable to other types of network services such as firewall acting as a Transport Layer Security (TLS) proxy.

In an example, user equipment (e.g., user equipment 102a) can establish a connection with a router (e.g., router 104), obtain identification for the router, communicate the identification of the router to a network element (e.g., network element 106) or cloud services (e.g., cloud services 108), receive at least a portion of a hash of an certificate for the router, and disconnect the connection and establish a new connection with the router, where the hash (or at least a portion of a hash) of the certificate is used to authenticate network services received from the router during the new connection with the router. In some examples, the network element generates the hash of a subject public key infrastructure (SPKI) structure in the certificate to create an SPKI fingerprint and the hash (or SPKI fingerprint) is used by the user equipment to generate an SPKI pin set. The binding to an SPKI pin set (or key) can be directly to an explicit key, or indirectly through the hash of the SPKI pin set. SPKI is a structure within a certificate and includes a public key of the certificate and an algorithm used for generating the public key. When the certificate expires and renews or otherwise changes, the public key and the algorithm used for generating the public key will not change. The SPKI fingperint is the output of a cryptographic hash algorithm (e.g. SHA-2) whose input is a DER-encoded ASN.1 representation of the SPKI of the certificate.

In an example, the network element receives identification information from the router. The identification information is used to associate a certificate with the router and the certificate can include an SPKI. The network element can generate an SPKI fingerprint of the SPKI in the certificate and the SPKI fingerprint can be a hash of the SPKI. The SPKI fingerprint of the SPKI in the certificate can be communicated to the user equipment where the user equipment can generate an SPKI pin set. When the router communicates with the user equipment, the communication can include the certificate associated with the router and the certificate will include the SPKI. The SPKI pin set can be used to validate the SPKI in the certificate from the router and communications from the router.

In some examples, the user equipment can establish a secure connection with the network element or cloud services to communicate the identification of the router to the network element or cloud services. The identification of the router can include a service set identifier-basic service set identifier (SSID-BSSID). The secure connection between the user equipment and the network element or cloud services can be established using a DNS over DNS-over (datagram) transport layer security ((D)TLS) message exchange.

In an embodiment, any number of user devices may be used, with each user device obtaining their own connection to router 104. Each connection can change or need to be reestablished each time user equipment 102 moves to a different network (e.g. moving from a home network to a work network or public network). When user equipment 102 moves to a different network, a new connection with a new trusted router can be established.

For purposes of illustrating certain example techniques of communication system 100, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One current trend is the use of devices connected to a local network and the Internet. The Internet has enabled interconnection of different computer networks all over the world. While the use of the Internet has transformed business and personal communications, it can also create a security challenge when trying to protect devices.

Various network services for user equipment are provided by home, wall-gardened, and open networks. A wall-gardened network is a network that controls a user equipment's access to web content and network services. Some of the typical network services provided to the user equipment include Dynamic Host Configuration Protocol (DHCP), DNS, Hypertext Transfer Protocol (HTTP) proxy, etc. Although these services are almost essential for the user equipment to connect to the Internet, the user equipment has no way to identify if these network services are hosted by a legitimate trusted network provider or by an attacker or malware.

Currently, there is not an automated way to bootstrap (e.g., auto-configure or configure with no or minimal user interaction) the user equipment to authenticate and trust the network services hosted in the attached network. This leads to attacks like DNS spoofing, rogue Wi-Fi access points and DNS cache poisoning, which can lead the user of the user equipment to visit malicious websites that may inject malware on the user equipment or that may engage in pervasive monitoring of the user equipment traffic by traffic redirection.

In an illustrative example, a rouge (or compromised) device can be connected to a trusted network and intercept DNS requests from the user equipment (e.g. using ARP spoofing) and spoof DNS responses with an attacker's IP addresses. Using the spoofed DNS responses, the user equipment (e.g., the target device) can be connected to an IP address associated with the attacker, thus allowing the attacker to infect the user equipment with malware or initiate pervasive monitoring. In another illustrative example, a rogue device sends a DHCP reconfigure message to the user equipment to change the DNS server to itself (e.g. using ARP spoofing). The rogue device starts receiving DNS queries sent from the user equipment and can lead the user equipment to malicious websites or initiate pervasive monitoring. This attack also compromises Domain Name System Security Extensions (DNSSEC) because while DNSSEC signs the DNS response records for validation, it is susceptible to man in the middle attacks.

In another illustrative example, if a router that the user equipment is connected to is acting as a TLS proxy to inspect the encrypted traffic for L7 security, then the browser on the user equipment for HTTPS traffic may throw an error if the root certificate authority (CA) is not trusted and the user must manually install the root CA. The downside to this manual installation of a root CA is that a typical user is not trained to install a root CA and may accept a root CA from an attacker trying to act as a man-in-the-middle device for HTTPS traffic. In yet another illustrative example, user equipment can attempt to connect to a public access point like an airport or hotel Wi-Fi but instead gets connected to the attacker's Wi-Fi using the same SSID name and Wi-Fi authentication credentials and becomes susceptible to man-in-the middle and privacy attacks. The user equipment cannot differentiate between the actual and rogue access points. These types of attacks can be mitigated if the user equipment is securely bootstrapped to authenticate the network services in the attached network.

Currently, to provision the user equipment with trust network services provided by a local network, wall-garden network or an open network, a root CA must be manually installed on the endpoints or the endpoint devices are pre-configured with images containing the root CA. In some current systems, an enterprise policy orchestrator is used to push the root CA via an agent installed on the endpoint. A domain controller can be used to distribute certificates to user equipment attached to an enterprise network using group policy. However, enterprise networks are usually not susceptible to duplicate access-point attacks or a MAC spoofed DNS redirection attacks which are very common in home or public access points. This is because an enterprise network typically uses media access control security (MACsec) to identify and prevent the security threats. However, MACsec is not suitable for home, wall-garden and open networks. Also, a group policy does not work in a home network and typically only works for Windows OS and does not associate the exported root CA to a specific network service. Currently, there is no mechanism to bootstrap or auto provision the user equipment to trust network services provided by a local network, wall-garden network or open network. What is needed is a mechanism that can help user equipment try to authenticate the network services provided by a network and to try to identify and reject network services hosted by attackers.

A system for authenticating network services provided by a network, as outlined in FIG. 1, can resolve these issues (and others). Communication system 100 can be configured to allow router 104 to become a trusted router and register with network element 106 or cloud services 108 as a trusted router. User equipment 102 can connect with router 104, obtain information for router 104, and check with network element 106 or cloud services 108 to determine if router 104 is registered as a trusted router. If router 104 is determined to be a trusted router, then user equipment 102 can connect to and trust router 104.

In a specific example, a router security engine (e.g., router security engine 118) in a router (e.g., router 104) communicates with an authentication engine (e.g., authentication engine 120) in a network element (e.g., network element 106) and/or cloud services (e.g., cloud services 108) and registers cryptographic material (e.g. DNS forwarder SPKI, certificate chain to validate the TLS proxy certificate, etc.) associated with network services that are provided by router 104.

The authentication engine acts as an orchestrator and builds transitive trust between ad-hoc user equipment attached to the router and network services associated with the router. The authentication engine can convey the cryptographic material required to authenticate the network services to the user equipment. On the user equipment, a UE engine (e.g., UE engine 116) can associate the cryptographic material with the attached network to restrict the scope of the cryptographic material. In case of a wall-garden or open network that does not have a security engine associated with the router, certificate signatures of network services are crowdsourced by a plurality of UE engines and after building a consensus, the certificate signatures are conveyed by the authentication engine to the user equipment and pinned on the user equipment to authenticate the network services from the router that does not have a security engine.

Turning to the infrastructure of FIG. 1, communication system 100 in accordance with an example embodiment is shown. Generally, communication system 100 can be implemented in any type or topology of networks. Local network 110 and network 112 represent a series of points or nodes of interconnected communication paths for receiving and transmitting packets of information that propagate through communication system 100. Each of local network 110 and network 112 offers a communicative interface between nodes. Local network 110 may be configured as any local area network (LAN), virtual local area network (VLAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 112 may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, user equipment 102 can include desktop computers, laptop computers, mobile devices, personal digital assistants, smartphones, tablets, wearables, IoTs, or other similar user equipment and/or devices. Router 104, network element 106, and cloud services 108 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of user equipment 102, router 104, network element 106, and cloud services 108 can include memory elements (e.g., memory 114) for storing information to be used in the operations outlined herein. Each of user equipment 102, router 104, network element 106, and cloud services 108 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, user equipment 102, and network elements of communication system 100, such as router 104, network element 106, and cloud services 108 may include modules (e.g., UE engine 116, router security engine 118, authentication engine 120, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of user equipment 102, and network elements of communication system 100, such as router 104, network element 106, and cloud services 108 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Cloud services 108 is configured to provide cloud services to user equipment 102 and router 104. Cloud services may generally be defined as the use of computing resources that are delivered as a service over a network, such as the Internet. The services may be distributed and separated to provide required support for user equipment 102 and router 104. Typically, compute, storage, and network resources are offered in a cloud infrastructure, effectively shifting the workload from a local network to the cloud network. Network element 106 can be a network element such as a server or virtual server and can be associated with clients, customers, endpoints, or end users wishing to initiate a communication in communication system 100 via some network (e.g., network 112). The term 'server' is inclusive of devices used to serve the requests of clients and/or perform some computational task on behalf of clients within communication system 100.

Figure 2:
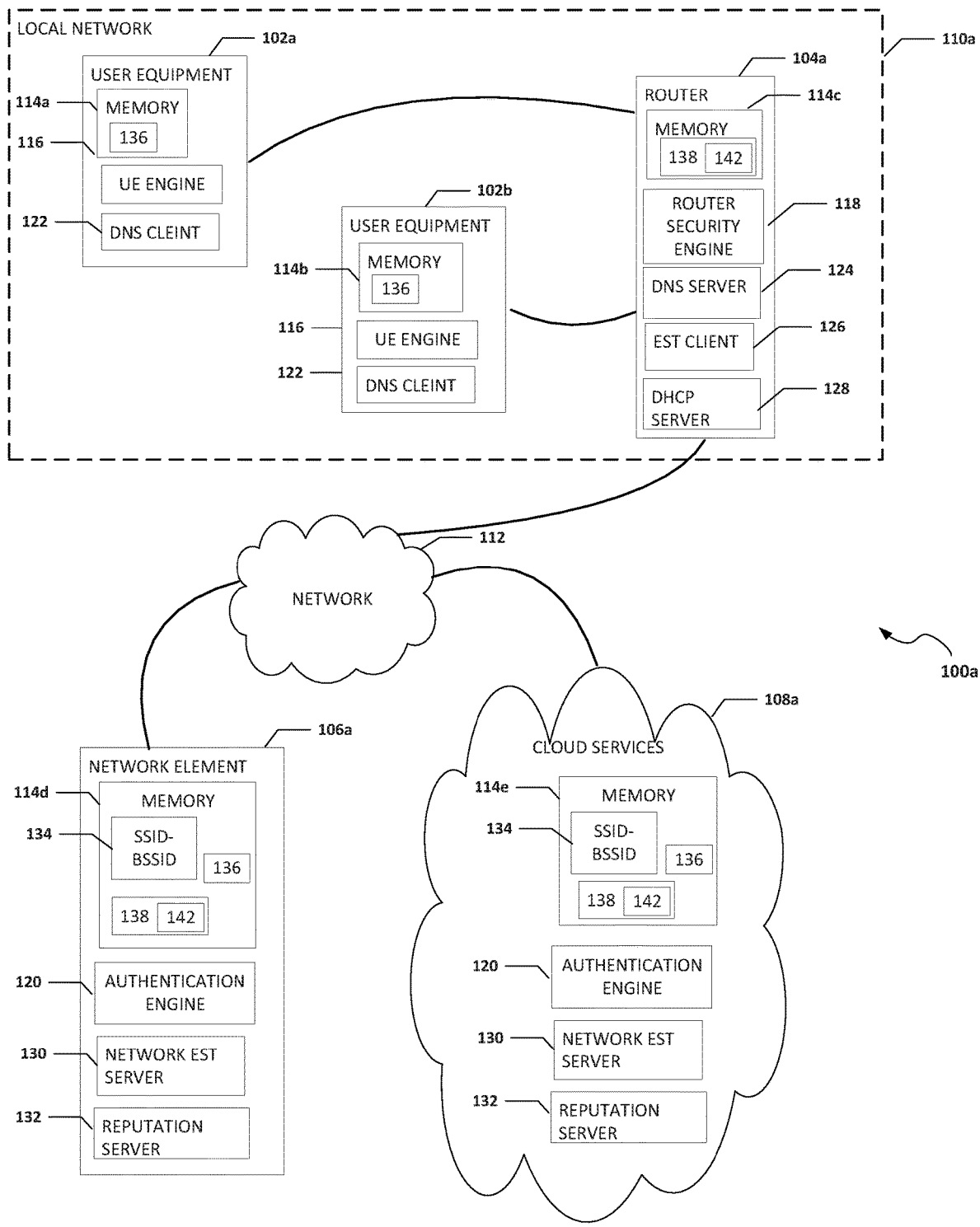
FIG. 2 is a simplified block diagram of a system for authenticating network services provided by a network in accordance with an embodiment of the present disclosure.

Turning to FIG. 2, FIG. 2 is a simplified block diagram of a communication system 100a for authenticating network services provided by a network in accordance with an embodiment of the present disclosure. As illustrated in FIG. 2, system 100a can include one or more instances of user equipment 102a and 102b, a router 104a, a network element 106a, and cloud services 108a. User equipment 102a and 102b may be in communication with router 104a using local network 110a (e.g., a home network). Router 104a can be in communication with network element 106a and cloud services 108a using network 112.

User equipment 102a can include memory 114a UE engine 116, and DNS client 122. Memory 114a can include a hash 136. Hash 136 may be a hash of a certificate or portion of a certificate (e.g., certificate 138), an SPKI fingerprint (e.g., a hash of the SPKI in certificate 138), an SPKI pin set, etc. User equipment 102b can include memory 114b UE engine 116, and DNS client 122. Memory 114b can include hash 136. Router 104a can include memory 114c, router security engine 118, a DNS server 124, an enrolment over secure transport (EST) client 126, and a DHCP server 128. Memory 114b can include a certificate 138. Certificate 138 can include an SPKI 142. DNS server 124 on router 104a can be configured as a DNS forwarder server. EST client 126 can be configured as an EST client. Network element 106a can include memory 114d, authentication engine 120, a network EST server 130, and a reputation server 132. Memory 114d can include SSID-BSSID database 134, hash 136, and certificate 138. Certificate 138 can include SPKI 142. Cloud services 108a can include memory 114e authentication engine 120, network EST server 130, and reputation server 132. Memory 114e can include SSID-BSSID database 134, hash 136, and certificate 138. Certificate 138 can include SPKI 142. SSID-BSSID database 134 can be configured to include SSIDs-BSSIDs and related data (e.g., trusted or untrusted, certificate, CA, SPKI pin set, etc.) for one or more routers.

Elements of FIG. 2 may be coupled to one another through one or more interfaces employing any suitable connections (wired or wireless), which provide viable pathways for network (e.g., local network 110a and network 112) communications. Additionally, any one or more of these elements of FIG. 2 may be combined or removed from the architecture based on particular configuration needs. Communication system 100a may include a configuration capable of TCP/IP communications for the transmission or reception of packets in a network. Communication system 100a may also operate in conjunction with a UDP/IP or any other suitable protocol where appropriate and based on particular needs.

In a specific example, DNS server 124 on router 104a can offer a DNS-over (D)TLS message exchange. DNS-over-(D)TLS can help provide confidentiality and integrity for DNS messages exchanged between user equipment (e.g., user equipment 102a and 102b) and DNS server 124. DNS-over-(D)TLS not only allows increased privacy but also security. DNSSEC is susceptible to man-in-middle attacks where an active attacker can clear the DNSSEC OK bit in the DNS query or strip the DNSSEC data from the DNS response to disable DNSSEC. DNSSEC requires DNS-over-(D)TLS to provide a secure channel.

Router 104a can use EST client 126 for EST certificate enrollment with network EST server 130. EST defines a method of certificate enrollment. Network EST server 130 can provision router 104a with a certificate for DNS server 124. DNS server 124 can use the certificate to authenticate itself and network services to the user equipment in local network 110a. EST client 126 on router 104a can authenticate to network EST server 130 using the certificate issued by the manufacturer or shared-credentials (e.g. license key) stored in memory 114c or through HTTP-based authentication. Router 104a conveys its SSID-BSSID to authentication engine 120. Authentication engine 120 associates the certificate generated by EST client 126 on router 104a with the SSID-BSSID of router 104a.

When new user equipment joins local network 110a, the user equipment learns the IP addresses of DNS server 124 from DHCP server 128 co-located on router 104a. The user equipment obtains the SSID-BSSID of router 104a and in some examples, obtains the certificate (e.g., certificate 138) of router 104a. A DNS client (e.g., DNS client 122) on the user equipment initiates a (D)TLS handshake with DNS server 124 and uses opportunistic encryption mode to skip authentication of the DNS forwarder certificate conveyed in the (D)TLS handshake in the server's hello message. In opportunistic encryption mode, the DNS client will attempt, but does not require, encryption and successful authentication; it therefore provides limited or no mitigation against such attacks but offers a maximum chance of DNS service.

UE engine 116 on the user equipment (e.g., user equipment 102a) blocks DNS traffic from all other applications on the user equipment, but resolves the fully qualified domain name (FQDN) of network element 106a or cloud services 108a and connects to network element 106a or cloud services 108a using HTTPS. Once connected, UE engine 116 communicates the SSID-BSSID of router 104a to authentication engine 120 in network element 106a or cloud services 108a. If the certificate for router 104a was obtained from router 104a, UE engine 116 can also communicate the certificate to authentication engine 120. If the certificate for router 104a was not obtained from router 104a, authentication engine 120 can use the SSID-BSSID to lookup or other obtain (e.g., generate) the certificate for router 104a. Authentication engine 120 can generate a SPKI fingerprint from the certificate and send the SPKI fingerprint of the certificate for the DNS server 124 to the user equipment. The user equipment will use the SPKI fingerprint to generate an associated SPKI pin-set of the certificate to authenticate DNS server 124 and the DNS forwarder certificate. When router 104a communicates with the user equipment, router 104a will include its certificate and the certificate includes the SPKI. The user equipment can use the SPKI pin set to validate the SPKI in the certificate and the data or services from router 104a that included the certificate.

DNS client 122 can change the mode of authentication from opportunistic to strict encryption mode in local network 110a, re-establish a (D)TLS session with DNS server 124, and validate the DNS forwarder certificate by matching the SPKI in the DNS forwarder certificate sent in the (D)TLS handshake in the server-hello message with the previously provisioned SPKI pin-set. If the match is successful, then UE engine 116 permits DNS traffic from all other applications on the user equipment to DNS server 124 over the DNS-over-(D)TLS session. If the match fails, then the user of the user equipment is recommended (e.g., sent a notification or alert) to disconnect from local network 110a, and is notified that a compromised device or attacker may be acting as an access point or DNS forwarder. The user can be suggested to either change the credentials to authenticate to the access point, turn-off each user equipment in the home network to identify the compromised device, or some other action. Whenever the user equipment re-attaches to the local network, it uses strict encryption mode to authenticate the DNS forwarder certificate and to secure the DNS message exchange with DNS server 124 located on router 104a to authenticate network services provide by the router.

A backup SPKI pin-set conveyed from the authentication engine 120 a can be helpful in the event of a certificate rollover so that authentication engine 120 does not need to simultaneously coordinate certificate transitions with a plurality of user equipment. If router 104a revokes the DNS forwarder certificate and generates a new certificate for DNS server 124, then authentication engine 120 can push the new SPKI pin-set generated from the new certificate to the user equipment attached to local network 110a (e.g. using HTTP/2.0 push notifications). The user equipment can update the SPKI pin-set accordingly.

In an example, TLS proxy can be offered as a network service on router 104a to inspect encrypted traffic. When router 104a is acting as a (D)TLS proxy to inspect the encrypted traffic, the above can also be used to auto-provision the user equipment with the certificate chain of router 104a. Router 104a generates and conveys the root certificate and intermediate certificates to authentication engine 120. Authentication engine 120 in turn propagates the certificate chain to UE engine 116 on the user equipment and the certificate chain is installed on the user equipment. UE engine 116 can inform router 104a, via authentication engine 120, that the root certificate is successfully installed and router 104a can act as a TLS proxy for the encrypted traffic from the user equipment. In a specific example, the root certificate is only installed on the user equipment if the user has selected local network 110a as a home network.

In a public network, router security engine 118 may or may not be included in a router. A DNS forwarder server co-located on the router offers DNS-over-(D)TLS message exchange to provide confidentiality and integrity for the DNS messages exchanged between the user equipment and the DNS forwarder. Whenever user equipment with UE engine 116 joins a new network, the user equipment learns the DNS forwarder's IP addresses from the DHCP server co-located on the router. The DNS client on the user equipment initiates a (D)TLS handshake with the DNS forwarder and uses opportunistic encryption mode to skip authentication of the DNS forwarder certificate.

UE engine 116 on the user equipment can generate an SPKI fingerprint and/or SPKI pin set from the DNS forwarder certificate and convey the SPKI fingerprint and/or SPKI pin set and SSID-BSSID for the public router to reputation server 132. Reputation server 132 can build a reputation score for the router and associate the SPKI fingerprint and/or SPKI pin-set with the secure DNS connectivity offered as a network service by the router. For a router with a high reputation score, the SPKI fingerprint and/or SPKI pin-set is associated with the SSID-BSSID of the router only after a threshold is satisfied (e.g., an "N" number (e.g., over 50, 100, 500, 2000, etc.) of user equipment convey the same SPKI fingerprint and/or SPKI pin-set to reputation server 132 over a predefined period (e.g., over 2 hours, 8 hours, 2 days, etc.). This consensus step can help prevent an attack scenario where an attacker hosts a network (e.g., Wi-Fi network) with the same SSID-BSSID but with a spoofed DNS forwarder certificate to receive DNS requests from victims attached to the attacker's wireless network. Generally, an attacker's wireless network will not generate a consensus or satisfy the threshold as the "N" number of user equipment will not convey the SPKI fingerprint and/or SPKI pin-set to reputation server 132 over the predefined period.

If the threshold is satisfied, then DNS client 122 on the user equipment can use a strict encryption mode, establish a (D)TLS session with the DNS server 124, and validate the DNS forwarder certificate sent in the DNS-over-(D)TLS handshake by matching with the SPKI pin-set received when the (D)TLS session was established with DNS server 124. If the match is successful, then UE engine 116 can permit DNS traffic from all the applications on the user equipment to the router (acting as a DNS forwarder) over the secure DNS-over-(D)TLS session. If the match fails, then the user of the user equipment is recommended to disconnect from the wireless network.

In an example, a user equipment can discover all or most of the routers available in the vicinity of the user equipment and ask reputation server 132 to provide any SPKIs, SPKI fingerprints, and/or or SPKI pin sets for all of the routers that satisfy a threshold and/or are considered as trusted. Reputation server 132, in addition to recommending the user equipment to use a specific router or SSID-BSSID that is associated with a router, conveys SPKIs, SPKI fingerprints, and/or or SPKI pin sets associated with the recommended specific router or SSID-BSSID of the router that is associated with a router to the user equipment. The user equipment associates the SPKI pin-set with the secure DNS connectivity service offered by the specific router or SSID-BSSID that is associated with a router. In another example, a user of the user equipment connects to a public access point and asks authentication engine 120 for the SPKI pin-set for an SSID-BSSID of a router. Authentication engine 120 can provide the pin-set and the user equipment can associate the pin-set with the secure DNS connectivity service offered by the router.

Figure 3:
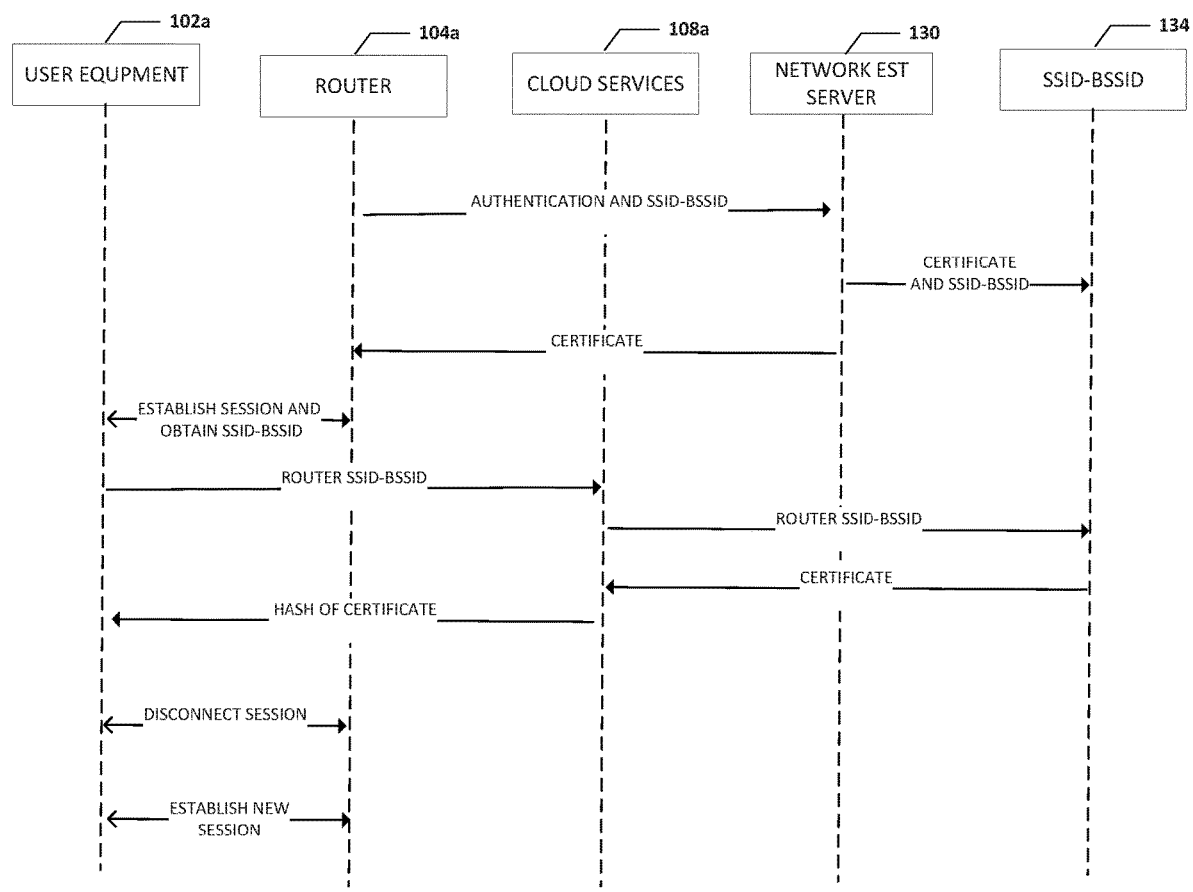
FIG. 3 is a simplified timing flow diagram illustrating potential operations that may be associated with the communication system in accordance with an embodiment.

Turning to FIG. 3, FIG. 3 is a simplified timing diagram illustrating example details of authenticating network services provided by a network in accordance with an embodiment of the present disclosure. As illustrated in FIG. 3, router 104a can send authentication data and its associated SSID-BSSID to network EST server 130. The authentication data can be a manufacture certificate, license key, or some other form of authentication data that can be used to authenticate router 104a. Network EST server 130 can generate a certificate for router 104 and communicate the certificate and SSID-BSSID for router 104a to SSID-BSSID database 134 for storage. Network EST server 130 can communicate the certificate to router 104a. In an example, network EST server 130 is located in a network element (e.g., network element 106a) or cloud services (e.g., cloud services 108a). The certificate can be used to help authenticate network services provided by router 104a. User equipment 102a can establish a session with router 104a and obtain the SSID-BSSID from router 104a. User equipment 102a can communicate the SSID-BSSID to cloud services 108a using a secure connection (e.g., HTTPS). In an example, user equipment 102a can communicate the SSID-BSSID to network element 106a.

Cloud services 108a can communicate the SSID-BSSID for router 104a and a request to obtain the certificate for router 104a to SSID-BSSID database 134. Using the SSID-BSSID for router 104a, SSID-BSSID database 134 can to obtain the certificate for router 104a and communicate the certificate to cloud services 108a. Cloud services 108a can hash at least a portion of the certificate for router 104a and communicate the hashed certificate (or hashed portion of the certificate) to user equipment 102a. The hashed portion of the certificate can be an SPKI fingerprint. After receiving the hash of the certificate, user equipment 102a can disconnect the session established earlier with router 104a and reconnect with router 104a to establish a new session and use the encrypted hash (or SPKI fingerprint) to authenticate network services from router 104a. For example, the user equipment disconnects the DNS-over-TLS session, re-establishes the DNS-over-TLS session and authenticates the server certificate received in the TLS handshake by comparing the SPKI in the certificate from the router with the SPKI fingerprint received from the cloud services 108a.

Figure 4:
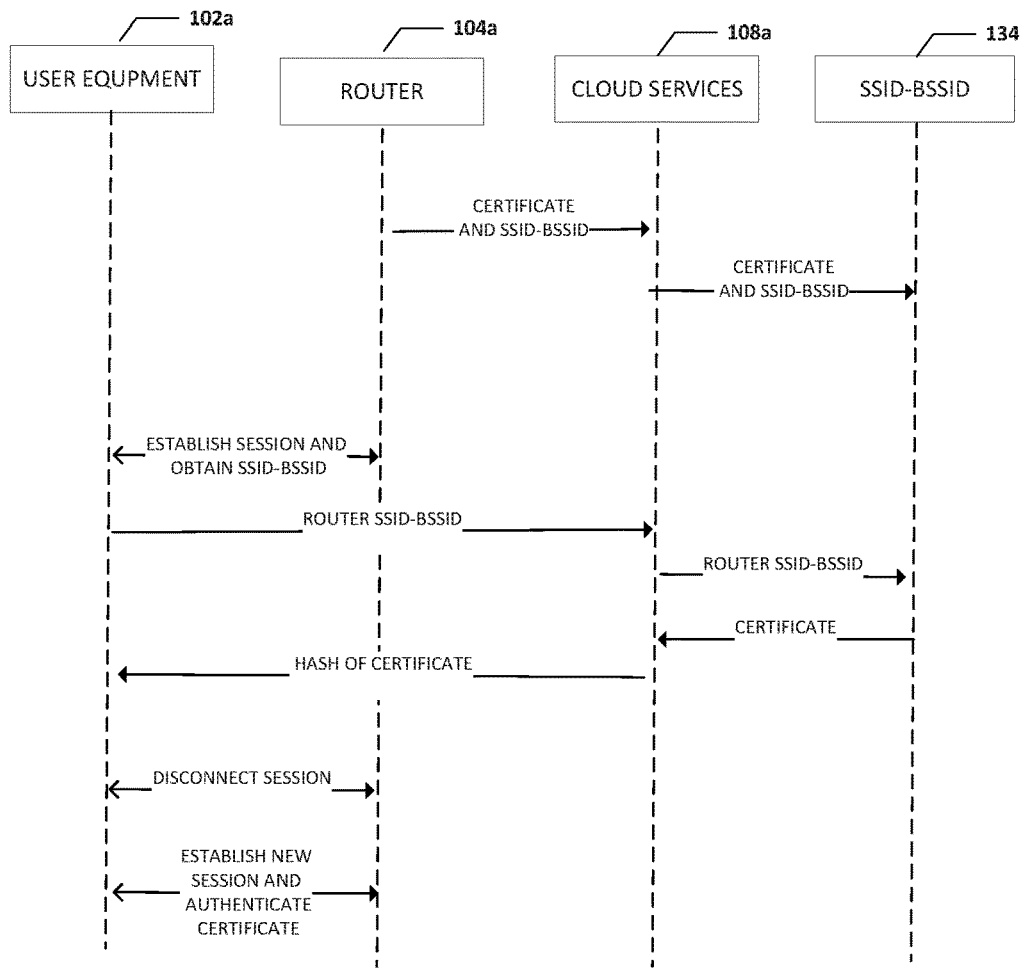
FIG. 4 is a simplified timing flow diagram illustrating potential operations that may be associated with the communication system in accordance with an embodiment.

Turning to FIG. 4, FIG. 4 is a simplified timing diagram illustrating example details of authenticating network services provided by a network in accordance with an embodiment of the present disclosure. As illustrated in FIG. 4, router 104a can send a router certificate and SSID-BSSID for router 104a to cloud services 108a. Router 104a may be a trusted router and be allowed to generate its own certificate. In an example, cloud services 108a can verify the certificate is a valid certificate for router 104a. In an example, router 104a authenticates itself to the cloud services 108a using a manufacturer provided certificate or pre-shared key or HTTP authentication mechanism and propagates its own certificate to the cloud services 108a using a secure communication channel like HTTPS. Cloud services 108a knows that the received certificate is a valid certificate for router 104a, as it has already authenticated the router.

Cloud services 108a can communicate the certificate and SSID-BSSID for router 104a to SSID-BSSID database 134 for storage. User equipment 102a can establish a session with router 104a and obtain the SSID-BSSID from router 104a. User equipment 102a can communicate the SSID-BSSID to cloud services 108a using a secure connection (e.g., HTTPS). In an example, user equipment 102a can communicate the SSID-BSSID to network element 106a. Cloud services 108a can communicate the SSID-BSSID and a request to obtain the certificate for router 104a to SSID-BSSID database 134. Using the SSID-BSSID for router 104a, SSID-BSSID database 134 can to obtain the certificate for router 104a and communicate the certificate to cloud services 108a. Cloud services 108a can hash at least a portion of the certificate for router 104a and communicate the hashed certificate (or hashed portion of the certificate) to user equipment 102a. After receiving the hash of the certificate (or hashed portion of the certificate), user equipment 102a can disconnect the session established earlier with router 104a and reconnect with router 104a to establish a new session and use the hashed certificate (or hashed portion of the certificate) to authenticate network services from router 104a.

Figure 5:
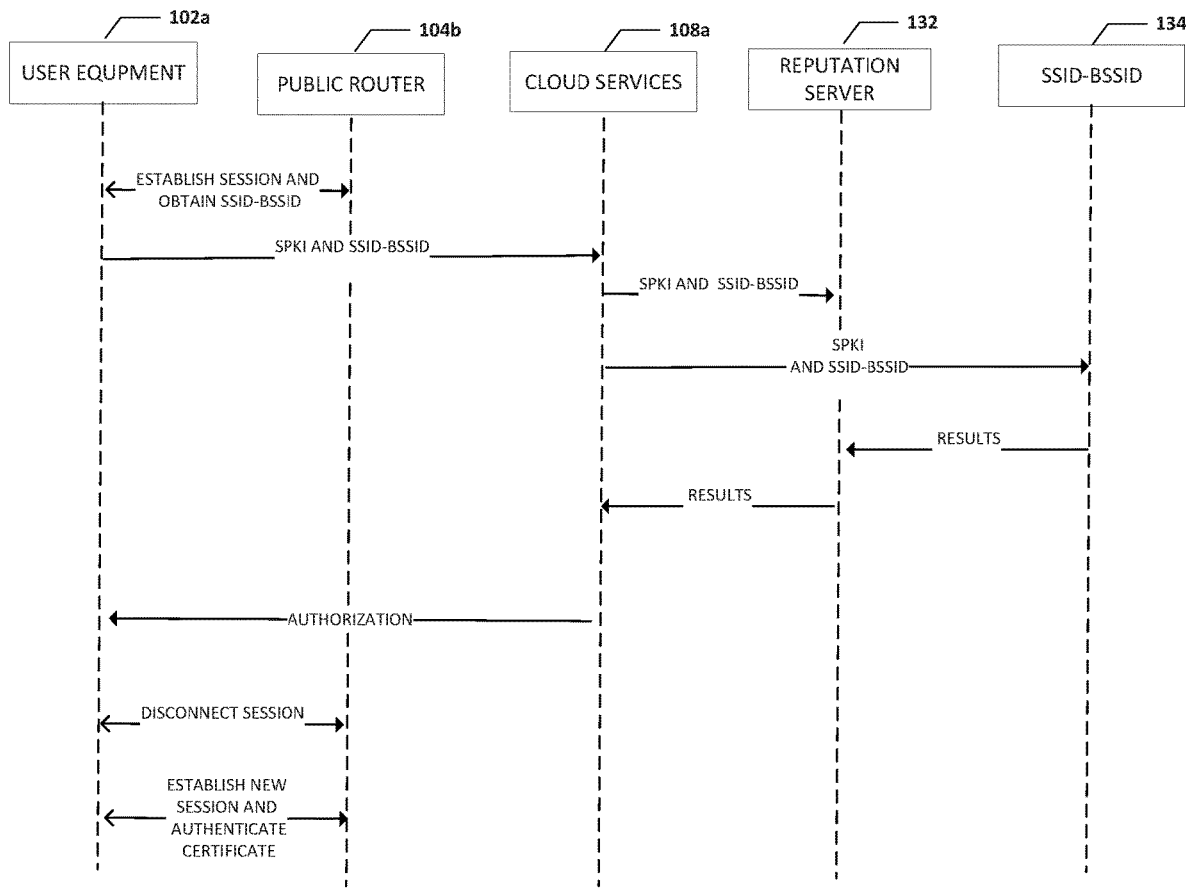
FIG. 5 is a simplified timing flow diagram illustrating potential operations that may be associated with the communication system in accordance with an embodiment.

Turning to FIG. 5, FIG. 5 is a simplified timing diagram illustrating example details of authenticating network services provided by a network in accordance with an embodiment of the present disclosure. As illustrated in FIG. 5, user equipment 102a can establish a session with public router 104b and obtain the SSID-BSSID for public router 104b. In an example, user equipment 102a can use opportunistic encryption for DNS over (D)TLS to establish the session with public router 104b. User equipment 102a can receive a certificate from public router 104b and generate an SPKI fingerprint for the certificate received from public router 104b (e.g., a DNS server 124 in public router 104b can communicate the certificate to user equipment 102a). User equipment 102a can communicate the SPKI fingerprint and SSID-BSSID for public router 104b to cloud services 108a. Cloud services 108a can communicate the SPKI fingerprint and SSID-BSSID for public router 104b to reputation server 132 and to SSID-BSSID database 134. In an example, reputation server 132 and SSID-BSSID database 134 are located in cloud services 108a. SSID-BSSID database 134 can look up the PKI fingerprint and SSID-BSSID for public router 104b to determine how many other user equipment have reported the PKI fingerprint and SSID-BSSID for public router 104b and return the results to reputation server 132. Reputation server can use the results and determine if public router 104b is a trusted router. For example, if the number of other user equipment that have reported the PKI fingerprint and SSID-BSSID for public router 104b is above a threshold, then public router 104b can be considered a trusted router. Reputation server 132 can return the results to cloud services 108a. Cloud services 108a can send an authorization to user equipment 102a that indicates if public router 104b is a trusted router. If public router 104b is a trusted router, then the current session between user equipment 102a and public router 104b can be disconnected and a new session can be established with a certificate to identify public router 104b.

Figure 6:
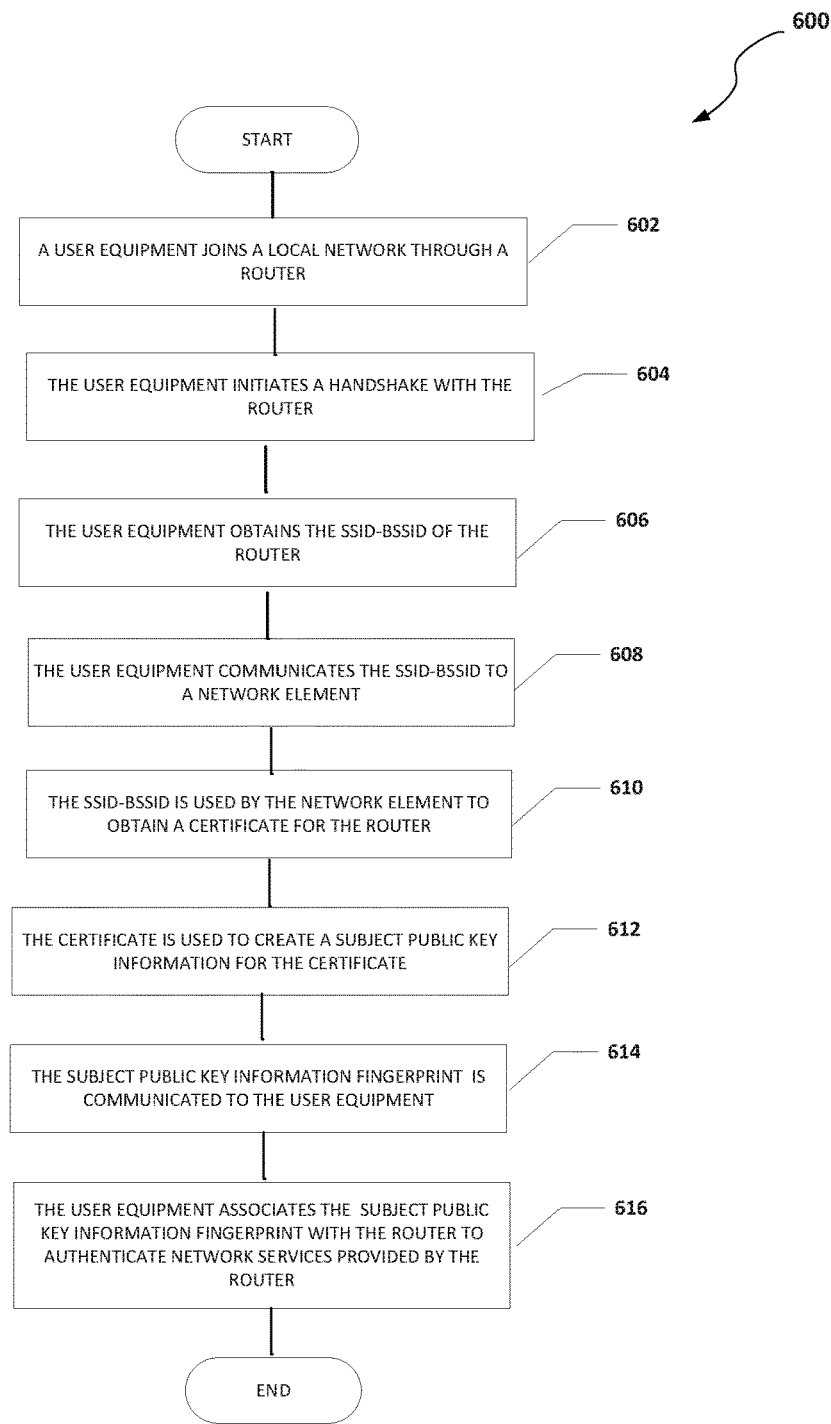
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with device paring in a local network, in accordance with an embodiment. In an embodiment, one or more operations of flow 600 may be performed by one or more of UE engine 116, router security engine 118, and/or authentication engine 120. At 602, a user equipment joins a local network through a router. At 604, the user equipment initiates a handshake with the router. At 606, the user equipment obtains the SSID-BSSID of the router. At 608, the user equipment communicates the SSID-BSSID to a network element. At 610, the SSID-BSSID is used by the network element to obtain a certificate for the router. At 612, the certificate is used to create a SPKI fingerprint for the certificate. At 614, the SPKI fingerprint is communicated to the user equipment. At 616, the user equipment associates the SPKI fingerprint with the router to authenticate network services provided by the router. In an example, the user equipment can generate an SPKI pin set from the SPKI fingerprint received from the network element and use the SPKI pin set to authenticate certificates associated with network services from the router.

Figure 7:
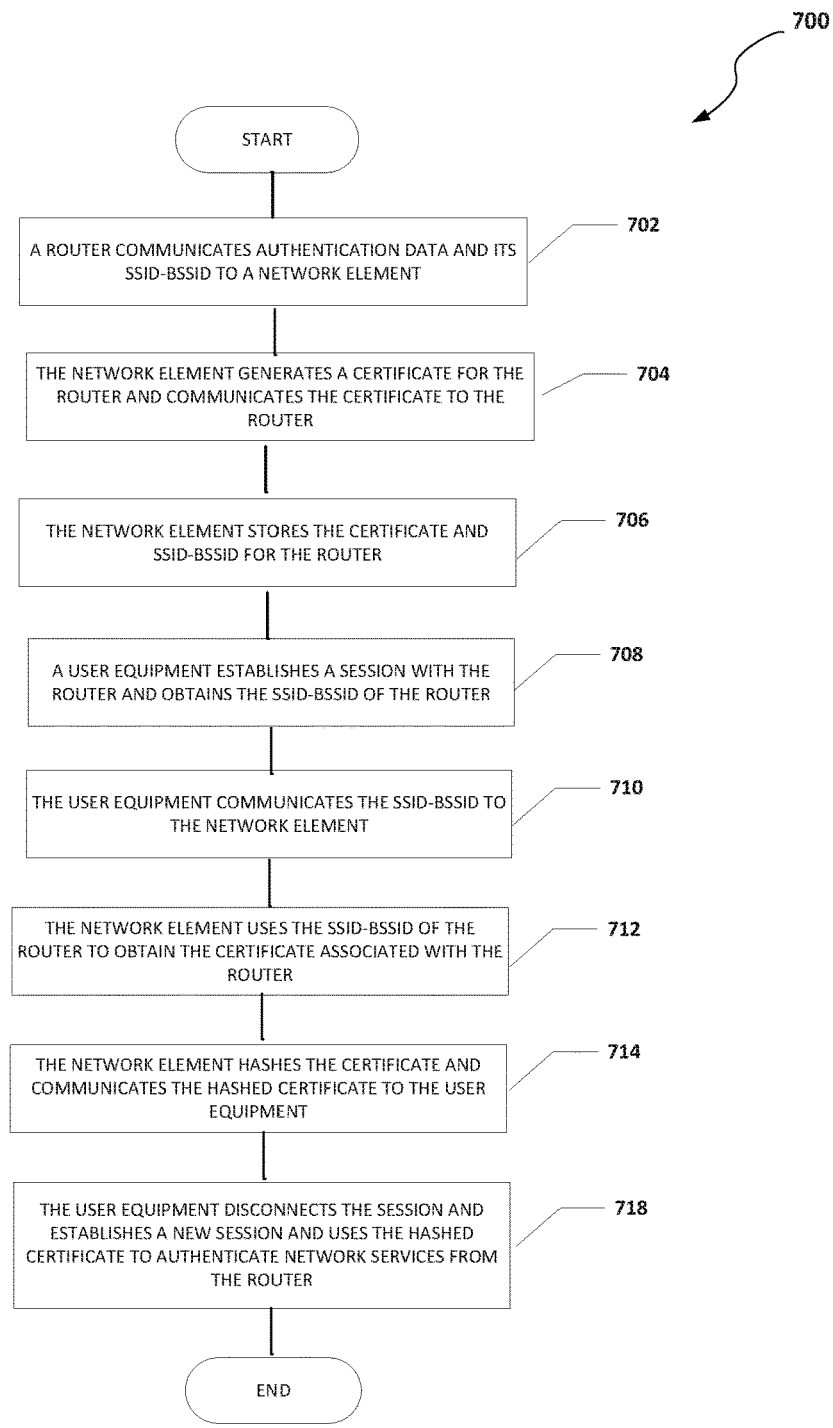
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with device paring in a local network, in accordance with an embodiment. In an embodiment, one or more operations of flow 700 may be performed by one or more of UE engine 116, router security engine 118, and/or authentication engine 120. At 702, a router communicates authentication data and its SSID-BSSID to a network element. At 704, the network element generates a certificate for the router and communicates the certificate to the router. At 706, the network element stores the certificate and SSID-BSSID for the router. At 708, a user equipment establishes a session with the router and obtains the SSID-BSSID of the router. At 710, the user equipment communicates the SSID-BSSID to the network element. At 712, the network element uses the SSID-BSSID of the router to obtain the certificate associated with the router. At 714, the network element hashes the certificate and communicates the hashed certificate to the user equipment. At 716, the user equipment disconnects the session, establishes and new session, and uses the hashed certificate to authenticate network services from the router.

Figure 8:
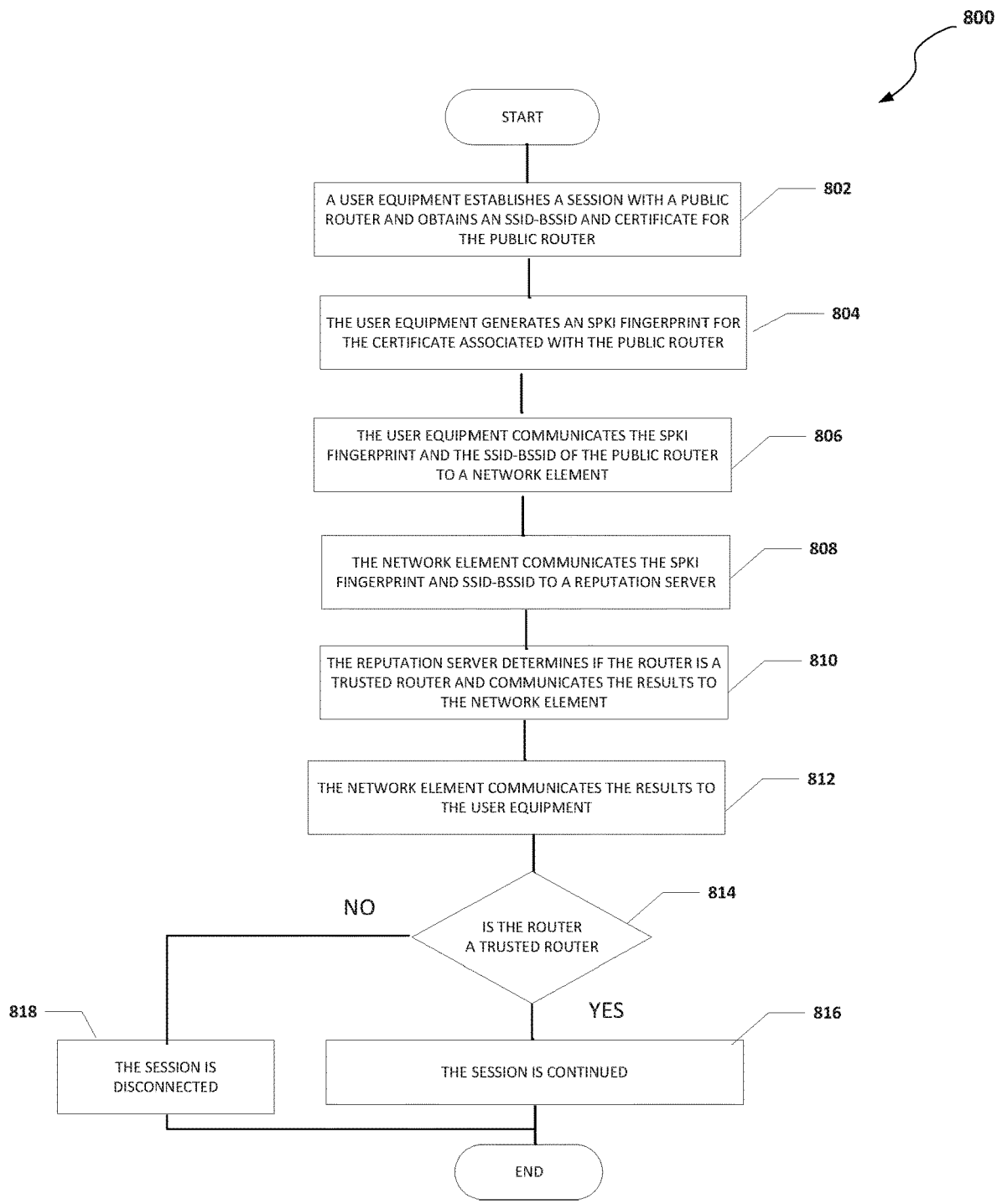
FIG. 8 is a simplified flowchart illustrating potential operations that may be associated with the communication system in accordance with an embodiment.

Turning to FIG. 8, FIG. 8 is an example flowchart illustrating possible operations of a flow 800 that may be associated with device paring in a local network, in accordance with an embodiment. In an embodiment, one or more operations of flow 800 may be performed by one or more of UE engine 116, router security engine 118, and/or authentication engine 120. At 802, a user equipment establishes a session with a public router and obtains an SSID-BSSID and certificate for the public router. At 804, the user equipment generates an SPKI fingerprint for the certificate associated with the public router. At 806, the user equipment communicates the SPKI fingerprint and the SSID-BSSID of the public router to a network element. At 808, the network element communicates the SPKI fingerprint and the SSID-BSSID to a reputation server. At 810, the reputation server determines if the router is a trusted router and communicates the results to the network element. At 812, the network element communicates the results to the user equipment. At 814, the system (e.g., the user equipment) determines if the router is a trusted router. If the router is a trusted router, then the session is continued, as in 816. If the router is not a trusted router, then the session is disconnected, as in 818.

Figure 9:
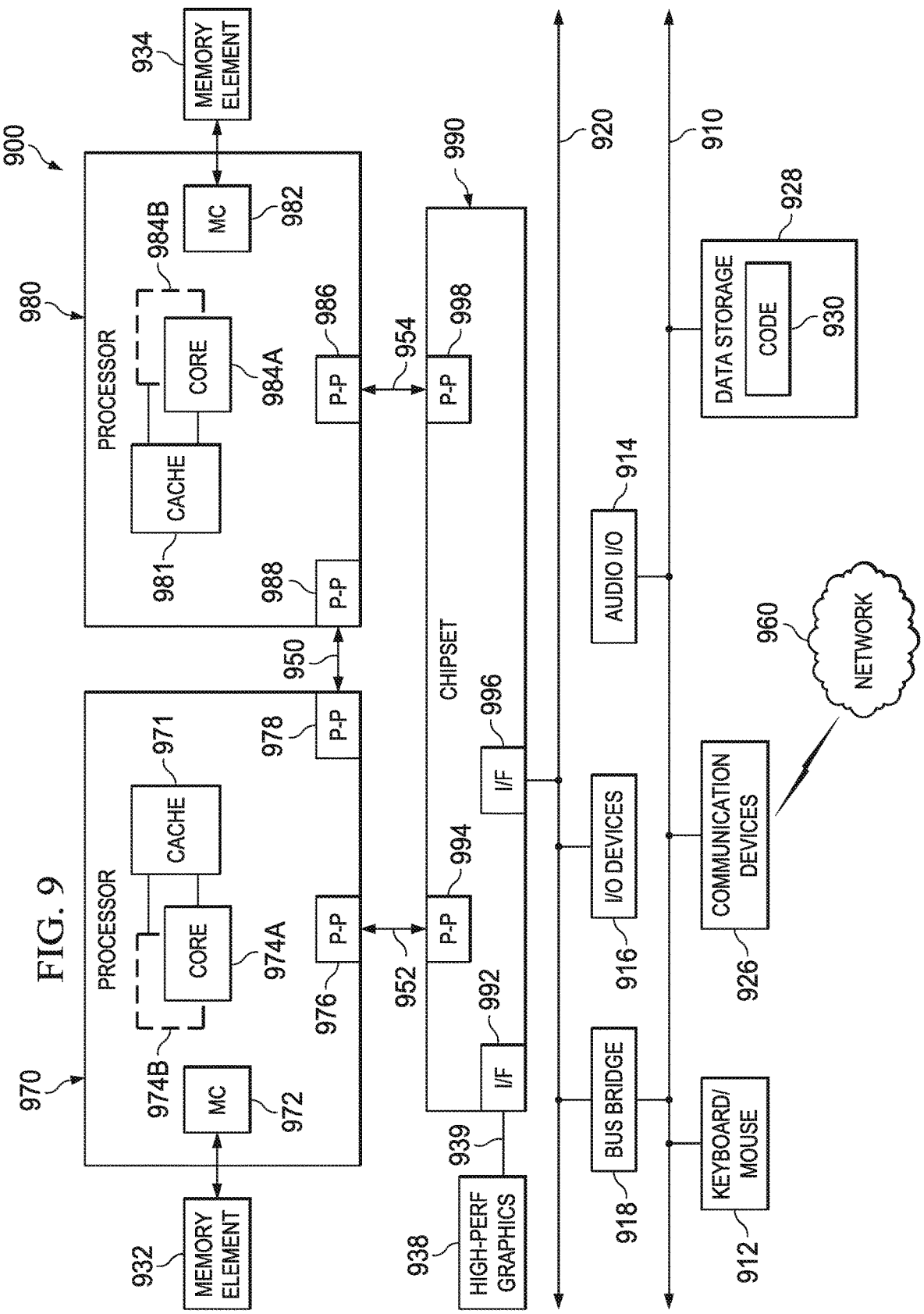
FIG. 9 is a block diagram illustrating an example computing system that is arranged in a point-to-point configuration in accordance with an embodiment.

Turning to FIG. 9, FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the network elements of communication systems 100 and 100*a* may be configured in the same or similar manner as computing system 900.

As illustrated in FIG. 9, system 900 may include several processors, of which only two, processors 970 and 980, are shown for clarity. While two processors 970 and 980 are shown, it is to be understood that an embodiment of system 900 may also include only one such processor. Processors 970 and 980 may each include a set of cores (i.e., processor cores 974*a* and 974*b* and processor cores 984*a* and 984*b*) to execute multiple threads of a program. The cores may be configured to execute instruction code in a manner similar to that discussed above with reference to FIGS. 1-8. Each processor 970, 980 may include at least one shared cache 971, 981. Shared caches 971, 981 may store data (e.g., instructions) that are utilized by one or more components of processors 970, 980, such as processor cores 974 and 984.

Processors 970 and 980 may also each include integrated memory controller logic (MC) 972 and 982 to communicate with memory elements 932 and 934. Memory elements 932 and/or 934 may store various data used by processors 970 and 980. In alternative embodiments, memory controller logic 972 and 982 may be discrete logic separate from processors 970 and 980.

Processors 970 and 980 may be any type of processor and may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, etc.), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 10:
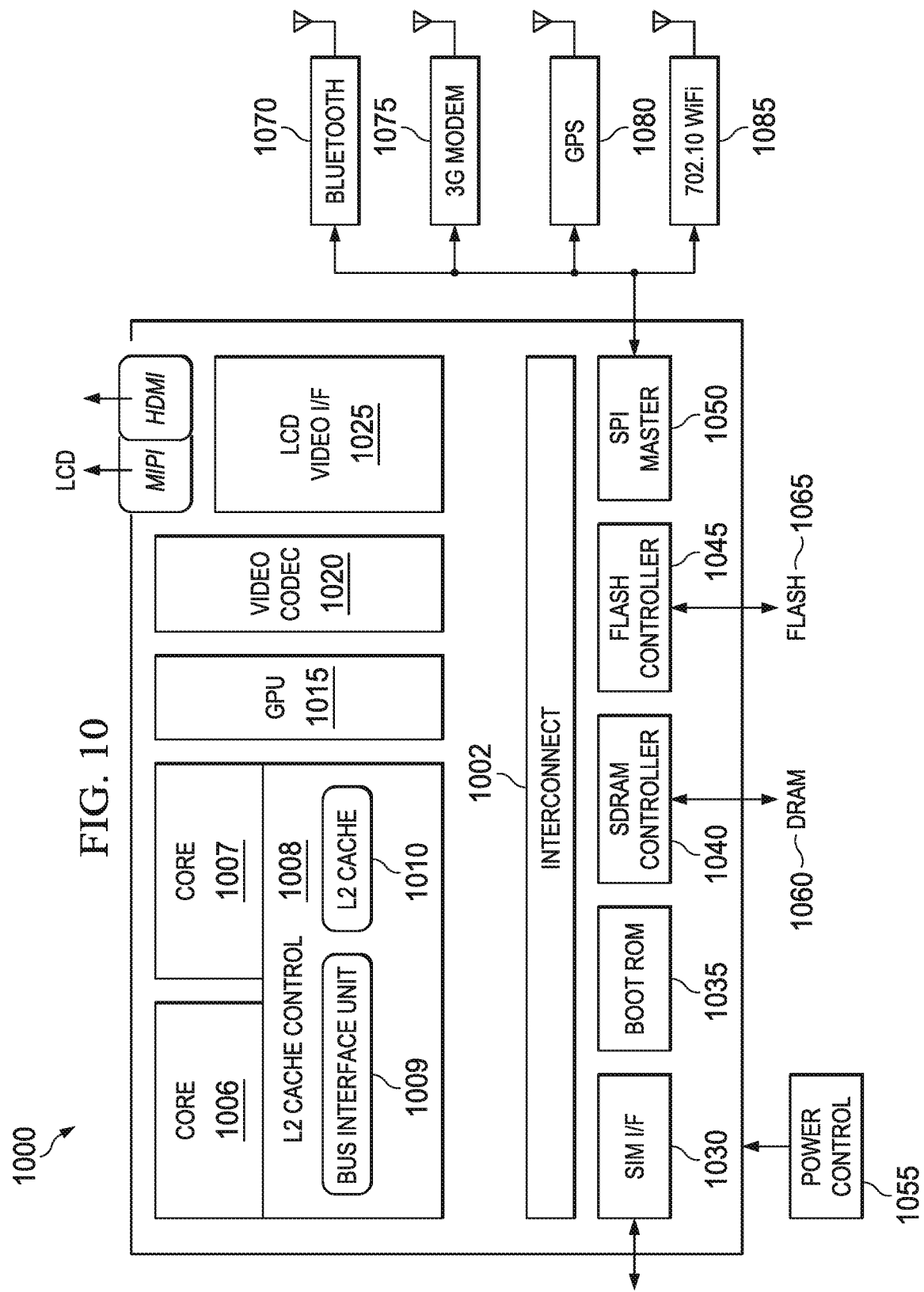
FIG. 10 is a simplified block diagram associated with an example ecosystem system on chip (SOC) of the present disclosure.

Turning to FIG. 10, FIG. 10 is a simplified block diagram associated with an example ecosystem SOC 1000 of the present disclosure. At least one example implementation of the present disclosure can include the device pairing in a local network features discussed herein and an ARM component. For example, the example of FIG. 10 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 10, ecosystem SOC 1000 may include multiple cores 1006-1007, an L2 cache control 1008, a bus interface unit 1009, an L2 cache 1010, a graphics processing unit (GPU) 1015, an interconnect 1002, a video codec 1020, and a liquid crystal display (LCD) I/F 1025, which may be associated with mobile industry processor interface (MIPI)/high-definition multimedia interface (HDMI) links that couple to an LCD.

Ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more embodiments include one or more communication capabilities, interfaces, and features such as instances of Bluetooth™ 1070, a 3G modem 1075, a global positioning system (GPS) 1080, and an 802.11 Wi-Fi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
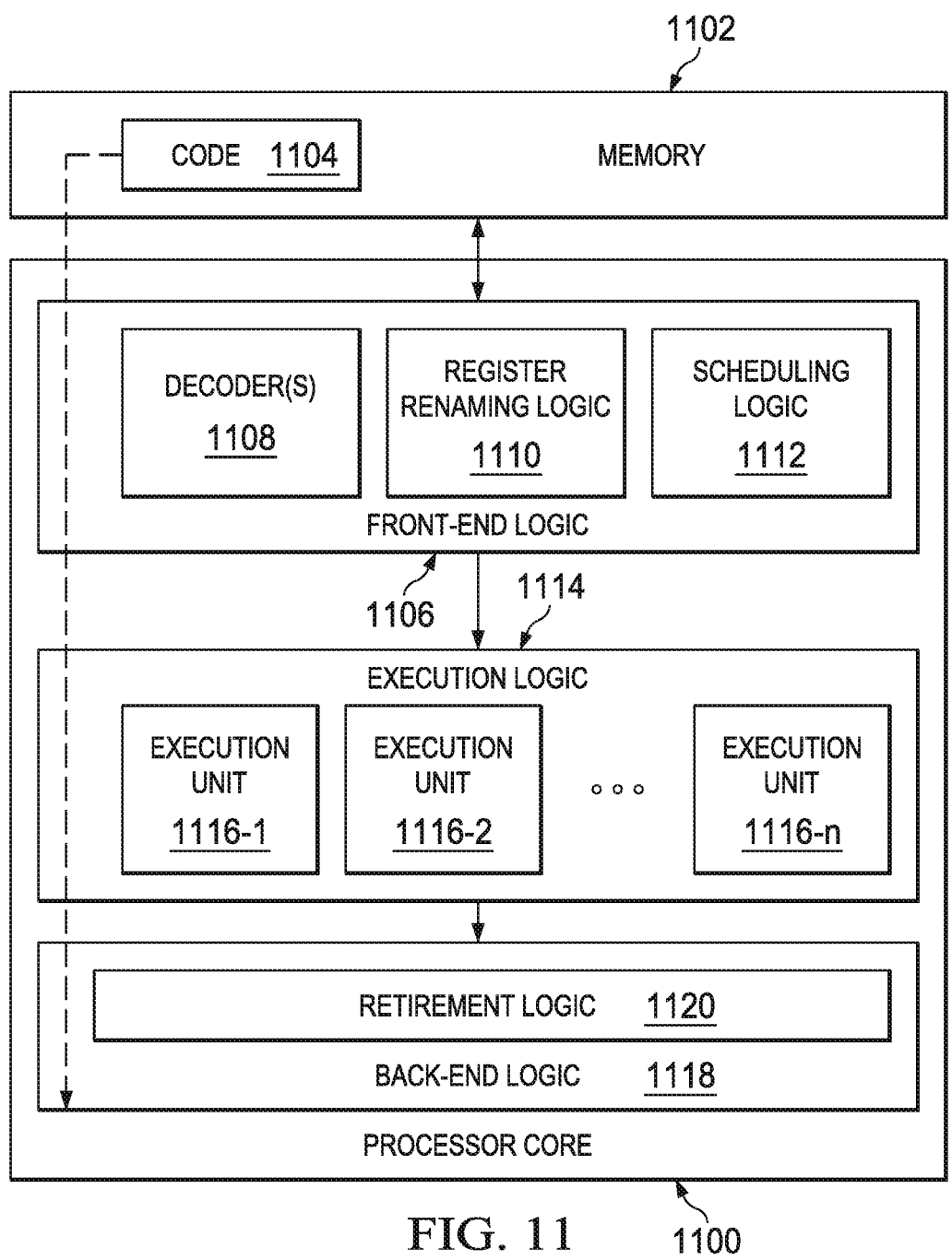
FIG. 11 is a block diagram illustrating an example processor core in accordance with an embodiment.

FIG. 11 illustrates a processor core 1100 according to an embodiment. Processor core 1100 may be the core for any type of processor, such as a micro-processor, an embedded processor, a digital signal processor (DSP), a network processor, or other device to execute code. Although only one processor core 1100 is illustrated in FIG. 11, a processor may alternatively include more than one of the processor core 1100 illustrated in FIG. 11. For example, processor core 1100 represents one example embodiment of processors cores 974*a*, 974*b*, 984*a*, and 984*b* shown and described with reference to processors 970 and 980 of FIG. 9. Processor core 1100 may be a single-threaded core or, for at least one embodiment, processor core 1100 may be multithreaded in that it may include more than one hardware thread context (or "logical processor") per core.

FIG. 11 also illustrates a memory 1102 coupled to processor core 1100 in accordance with an embodiment. Memory 1102 may be any of a wide variety of memories (including various layers of memory hierarchy) as are known or otherwise available to those of skill in the art. Memory 1102 may include code 1104, which may be one or more instructions, to be executed by processor core 1100.

Processor core 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor core 1100 can also include execution logic 1114 having a set of execution units 1116-1 through 1116-N. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor core 1100 allows out of order execution but requires in order retirement of instructions. Retirement logic 1120 may take a variety of known forms (e.g., re-order buffers or the like). In this manner, processor core 1100 is transformed during execution of code 1104, at least in terms of the output generated by the decoder, hardware registers and tables utilized by register renaming logic 1110, and any registers (not shown) modified by execution logic 1114.

Although not illustrated in FIG. 11, a processor may include other elements on a chip with processor core 1100, at least some of which were shown and described herein with reference to FIG. 10. For example, a processor may include memory control logic along with processor core 1100. The processor may include I/O control logic and/or may include I/O control logic integrated with the memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 6-8) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one processor to establish a connection with a router, obtain identification for the router, communicate the identification of the router to a network element, receive a hash of at least a portion of a certificate for the router, and disconnect the connection and establish a new connection with the router, where the hash is used to authenticate network services received from the router during the new connection.

In Example C2, the subject matter of Example C1 can optionally include where the network element generates the hash.

In Example C3, the subject matter of any one of Examples C1-C2 can optionally include where the hash is part of a subject public key infrastructure (SPKI) pin set.

In Example C4, the subject matter of any one of Examples C1-C3 can optionally include one or more instructions that when executed by the at least one processor, cause the at least one processor to establish a secure connection with the network element, where the secure connection is used to communicate the identification of the router to the network element.

In Example C5, the subject matter of any one of Examples C1-C4 can optionally include where the identification is a service set identifier-basic service set identifier (SSID-BSSID).

In Example C6, the subject matter of any one of Examples C1-05 can optionally include where the new connection is established using a domain name system (DNS)-over datagram transport layer security ((D)TLS) message exchange.

In Example C7, the subject matter of any one of Example C1-C6 can optionally include where identification for the router is obtained using a certificate received from the router when the connection was established.

In Example C8, the subject matter of any one of Examples C1-C7 can optionally include where the router is verified as a trusted router from the network element.

In Example A1, an electronic device can include memory, a user equipment engine, and at least one processor. The user equipment engine is configured to cause the least one processor to establish a connection with a router, obtain identification for the router, communicate the identification of the router to a network element, receive a hash of at least a portion of a certificate for the router, and disconnect the connection and establish a new connection with the router, where the hash of the certificate is used to authenticate network services received from the router during the new connection.

In Example, A2, the subject matter of Example A1 can optionally include where the hash is part of a subject public key infrastructure (SPKI) pin set.

In Example A3, the subject matter of any one of Examples A1-A2 can optionally include where the user equipment engine is further configured to cause the least one processor to establish a secure connection with the network element, where the secure connection is used to communicate the identification of the router to the network element.

In Example A4, the subject matter of any one of Examples A1-A3 can optionally include where the identification is a service set identifier-basic service set identifier (SSID-BSSID).

In Example A5, the subject matter of any one of Examples A1-A4 can optionally include where the new connection is established using a domain name system (DNS)-over (datagram) transport layer security ((D)TLS) message exchange.

In Example A6, the subject matter of any one of Examples A1-A5 can optionally include where identification for the router is obtained using a certificate received from the router when the connection was established.

In Example A7, the subject matter of any one of Examples A1-A6 can optionally include where the router is verified as a trusted router from the network element.

Example M1 is a method including establishing a connection with a router, obtaining identification for the router, communicating the identification of the router to a network element, receiving a hash of at least a portion of a certificate for the router, and disconnecting the connection and establish a new connection with the router, where the hash is used to authenticate network services received from the router during the new connection.

In Example M2, the subject matter of Example M1 can optionally include where the network element generates the hash.

In Example M3, the subject matter of any one of the Examples M1-M2 can optionally include where the hash is part of a subject public key infrastructure (SPKI) pin set.

In Example M4, the subject matter of any one of the Examples M1-M3 can optionally include establishing a secure connection with the network element, where the secure connection is used to communicate the identification of the router to the network element.

In Example M5, the subject matter of any one of the Examples M1-M4 can optionally include where the identification is a service set identifier-basic service set identifier (SSID-BSSID).

In Example M6, the subject matter of any one of the Examples M1-M5 can optionally include where the new connection is established using a domain name system (DNS)-over (datagram) transport layer security ((D)TLS) message exchange.

In Example M7, the subject matter of any one of the Examples M1-M6 can optionally include where identification for the router is obtained using a certificate received from the router when the connection was established.

Example S1 is a system for authenticating network services, the system including a user equipment engine. The user equipment engine is configured to establish a connection with a router, obtain identification for the router, communicate the identification of the router to a network element, receive a hash of at least a portion of an certificate for the router, and disconnect the connection and establish a new connection with the router, where the hash is used to authenticate network services received from the router during the new connection.

In Example S2, the subject matter of Example S1 can optionally include where the network element generates the hash.

In Example S3, the subject matter of any of the Examples S1-S2 can optionally include where the new connection is established using a domain name system (DNS)-over (datagram) transport layer security ((D)TLS) message exchange.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, cause the at least one processor to:
    establish a connection between a router and user equipment;
    obtain, at the user equipment, identification for the router;
    communicate, from the user equipment, the identification of the router to a network element, wherein the network element is separate from the router;
    receive, at the user equipment, a hash of at least a portion of a certificate for the router; and
    disconnect the connection between the router and the user equipment and establish a new connection between the router and user equipment, wherein the hash is used to authenticate network services received by the user equipment from the router during the new connection.

2. The at least one machine readable medium of claim 1, wherein the network element generated the hash.

3. The at least one machine readable medium of claim 1, wherein the hash is part of a subject public key infrastructure (SPKI) pin set.

4. The at least one machine readable medium of claim 1, further comprising one or more instructions that when executed by the at least one processor, cause the at least one processor to:
    establish a secure connection with the network element, wherein the secure connection is used to communicate the identification of the router to the network element.

5. The at least one machine readable medium of claim 1, wherein the identification is a service set identifier-basic service set identifier (SSID-BSSID).

6. The at least one machine readable medium of claim 1, wherein the new connection is established using a domain name system (DNS)-over datagram transport layer security ((D)TLS) message exchange.

7. The at least one machine readable medium of claim 1, wherein identification for the router is obtained using a certificate received from the router when the connection was established.

8. The at least one machine readable medium of claim 1, wherein the router is verified as a trusted router from the network element.

9. An electronic device comprising:
memory;
a user equipment engine; and
at least one processor, wherein the user equipment engine is configured to cause the least one processor to:
establish a connection between a router and user equipment;
obtain, at the user equipment, identification for the router;
communicate, from the user equipment, the identification of the router to a network element, wherein the network element is separate from the router;
receive, at the user equipment, a hash of at least a portion of a certificate for the router; and
disconnect the connection between the router and the user equipment and establish a new connection between the router and user equipment, wherein the hash is used to authenticate network services received by the user equipment from the router during the new connection.

10. The electronic device of claim 9, wherein the hash is part of a subject public key infrastructure (SPKI) pin set.

11. The electronic device of claim 9, wherein the user equipment engine is further configured to cause the least one processor to:
establish a secure connection with the network element, wherein the secure connection is used to communicate the identification of the router to the network element.

12. The electronic device of claim 11, wherein the identification is a service set identifier-basic service set identifier (SSID-BSSID).

13. The electronic device of claim 9, wherein the new connection is established using a domain name system (DNS)-over (datagram) transport layer security ((D)TLS) message exchange.

14. The electronic device of claim 9, wherein identification for the router is obtained using a certificate received from the router when the connection was established.

15. The electronic device of claim 9, wherein the router is verified as a trusted router from the network element.

16. A method comprising:
establishing a connection between a router and user equipment;
obtaining, at the user equipment, identification for the router;
communicating, from the user equipment, the identification of the router to a network element, wherein the network element is separate from the router;
receiving, at the user equipment, a hash of at least a portion of a certificate for the router; and
disconnecting the connection between the router and the user equipment and establishing a new connection between the router and user equipment, wherein the hash is used to authenticate network services received by the user equipment from the router during the new connection.

17. The method of claim 16, wherein the network element generates the hash.

18. The method of claim 16, wherein the hash is part of a subject public key infrastructure (SPKI) pin set.

19. The method of claim 18, further comprising:
establishing a secure connection with the network element, wherein the secure connection is used to communicate the identification of the router to the network element.

20. The method of claim 16, wherein the identification is a service set identifier-basic service set identifier (SSID-BSSID).

21. The method of claim 16, wherein the new connection is established using a domain name system (DNS)-over (datagram) transport layer security ((D)TLS) message exchange.

22. The method of claim 16, wherein identification for the router is obtained using a certificate received from the router when the connection was established.

23. A system for authenticating network services, the system comprising:
memory; and
a user equipment engine, wherein the user equipment engine is configured to:
establish a connection between a router and user equipment;
obtain, at the user equipment, identification for the router;
communicate, from the user equipment, the identification of the router to a network element, wherein the network element is separate from the router;
receive, at the user equipment, a hash of at least a portion of a certificate for the router; and
disconnect the connection between the router and the user equipment and establish a new connection between the router and user equipment, wherein the hash is used to authenticate network services received by the user equipment from the router during the new connection.

24. The system of claim 23, wherein the network element generates the hash.

25. The system of claim 23, wherein the new connection is established using a domain name system (DNS)-over (datagram) transport layer security ((D)TLS) message exchange.

* * * * *

UNITED STATES PATENT AND TRADEMARK OFFICE
CERTIFICATE OF CORRECTION

PATENT NO. : 10,791,118 B2
APPLICATION NO. : 15/940573
DATED : September 29, 2020
INVENTOR(S) : Tirumaleswar Reddy Konda et al.

Page 1 of 1

It is certified that error appears in the above-identified patent and that said Letters Patent is hereby corrected as shown below:

On the Title Page

In Column 2 under "OTHER PUBLICATIONS", Line 1, delete "Intentional" and insert -- International --, therefor.

In Column 2 under "OTHER PUBLICATIONS", Line 1, delete "Intentional" and insert -- International --, therefor.

In the Drawings

On sheet 2 of 11, in Figure 2, Line 5 (approx.), Reference Numeral 102a, delete "CLEINT" and insert -- CLIENT --, therefor.

On sheet 2 of 11, in Figure 2, Line 5 (approx.), Reference Numeral 102b, delete "CLEINT" and insert -- CLIENT --, therefor.

On sheet 3 of 11, in Figure 3, Line 1, Reference Numeral 102a, delete "EQUPMENT" and insert -- EQUIPMENT --, therefor.

On sheet 4 of 11, in Figure 4, Line 1, Reference Numeral 102a, delete "EQUPMENT" and insert -- EQUIPMENT --, therefor.

On sheet 5 of 11, in Figure 5, Line 1, Reference Numeral 102a, delete "EQUPMENT" and insert -- EQUIPMENT --, therefor.

Signed and Sealed this
Tenth Day of November, 2020

Andrei Iancu
*Director of the United States Patent and Trademark Office*